(No Model.)  5 Sheets—Sheet 2.

A. MOUGIN.
ELECTRIC ARC LAMP.

No. 597,424.  Patented Jan. 18, 1898.

WITNESSES:

INVENTOR
Adolph Mougin
BY
ATTORNEYS.

(No Model.)
5 Sheets—Sheet 3.
A. MOUGIN.
ELECTRIC ARC LAMP.
No. 597,424. Patented Jan. 18, 1898.
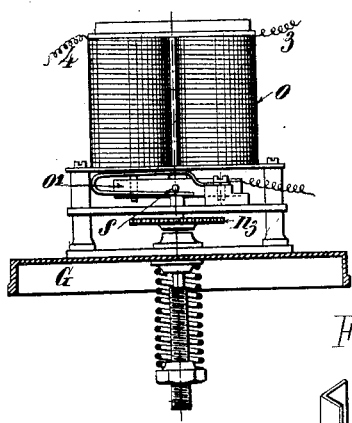
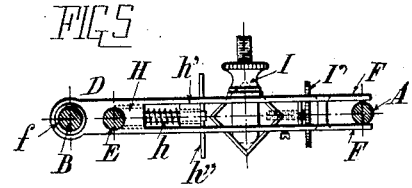
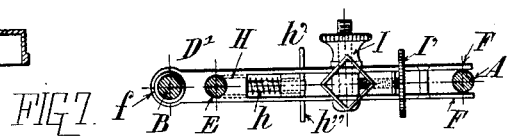
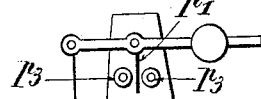
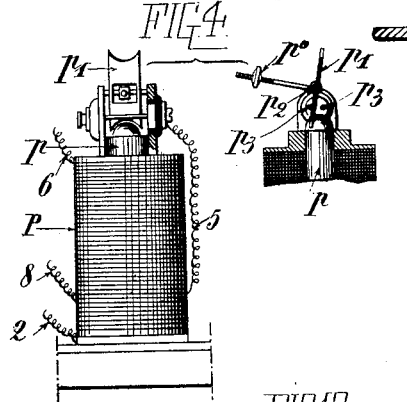
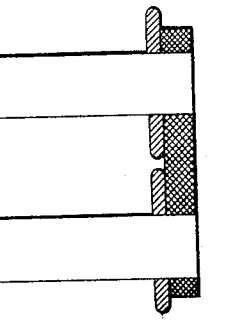
WITNESSES:
Geo. W. Jackel
Carl Kabig
INVENTOR
Adolphe Mougin
BY
ATTORNEYS.
THE NORRIS PETERS CO., PHOTO-LITHO., WASHINGTON, D. C.

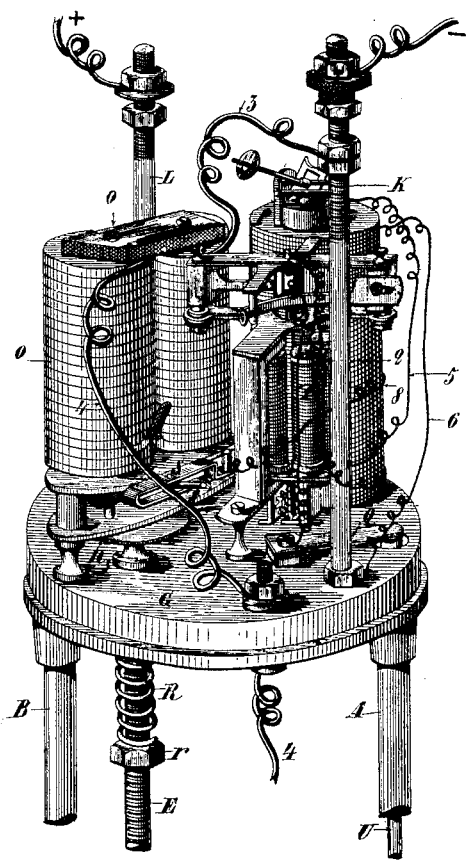

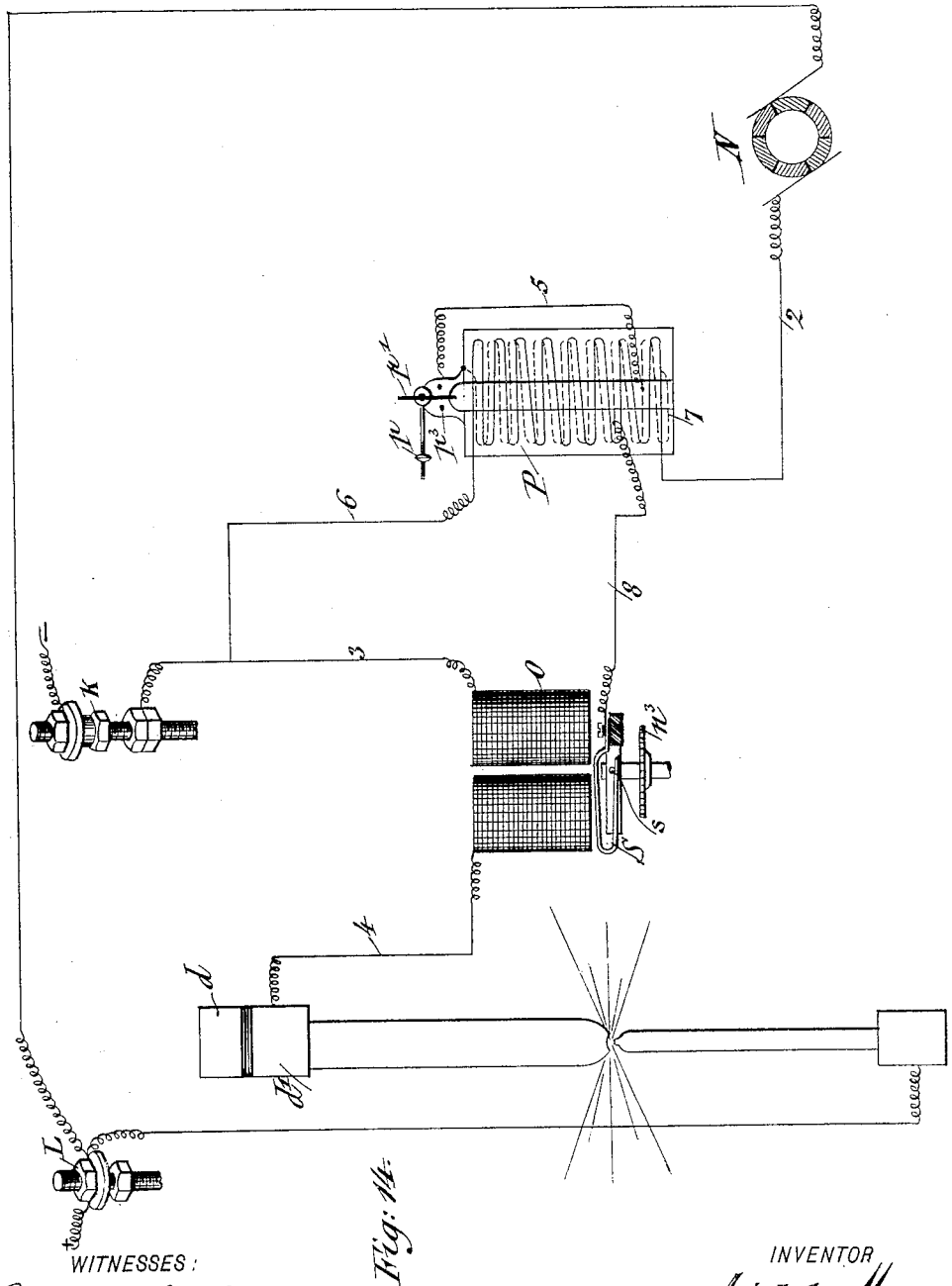

UNITED STATES PATENT OFFICE.

ADOLPHE MOUGIN, OF PARIS, FRANCE, ASSIGNOR TO LA SOCIÉTÉ LES FILS D'ADOLPHE MOUGIN, OF HÉRICOURT, FRANCE.

ELECTRIC-ARC LAMP.

SPECIFICATION forming part of Letters Patent No. 597,424, dated January 18, 1898.

Application filed February 13, 1897. Serial No. 623,240. (No model.) Patented in France February 11, 1895, No. 245,018; in Germany February 28, 1895, No. 83,783; in Belgium August 7, 1895, No. 116,863, and in England August 23, 1895, No. 15,889.

*To all whom it may concern:*

Be it known that I, ADOLPHE MOUGIN, a citizen of the Republic of France, residing at Paris, France, have invented certain new and useful Improvements in Electric-Arc Lamps, (for which I have obtained patents in France, No. 245,018, dated February 11, 1895; in England, No. 15,889, dated August 23, 1895; in Germany, No. 83,783, dated February 28, 1895, and in Belgium, No. 116,863, dated August 7, 1895,) of which the following is a specification.

This invention relates to unifocal electric-arc lamps, and is designed to maintain the light at a constant degree of intensity, the lamp being, moreover, adapted for working with a continuous or with an alternating current.

In the accompanying drawings I have illustrated my improvements as applied, by way of example, to an electric-arc lamp working with a continuous current.

Figure 1:
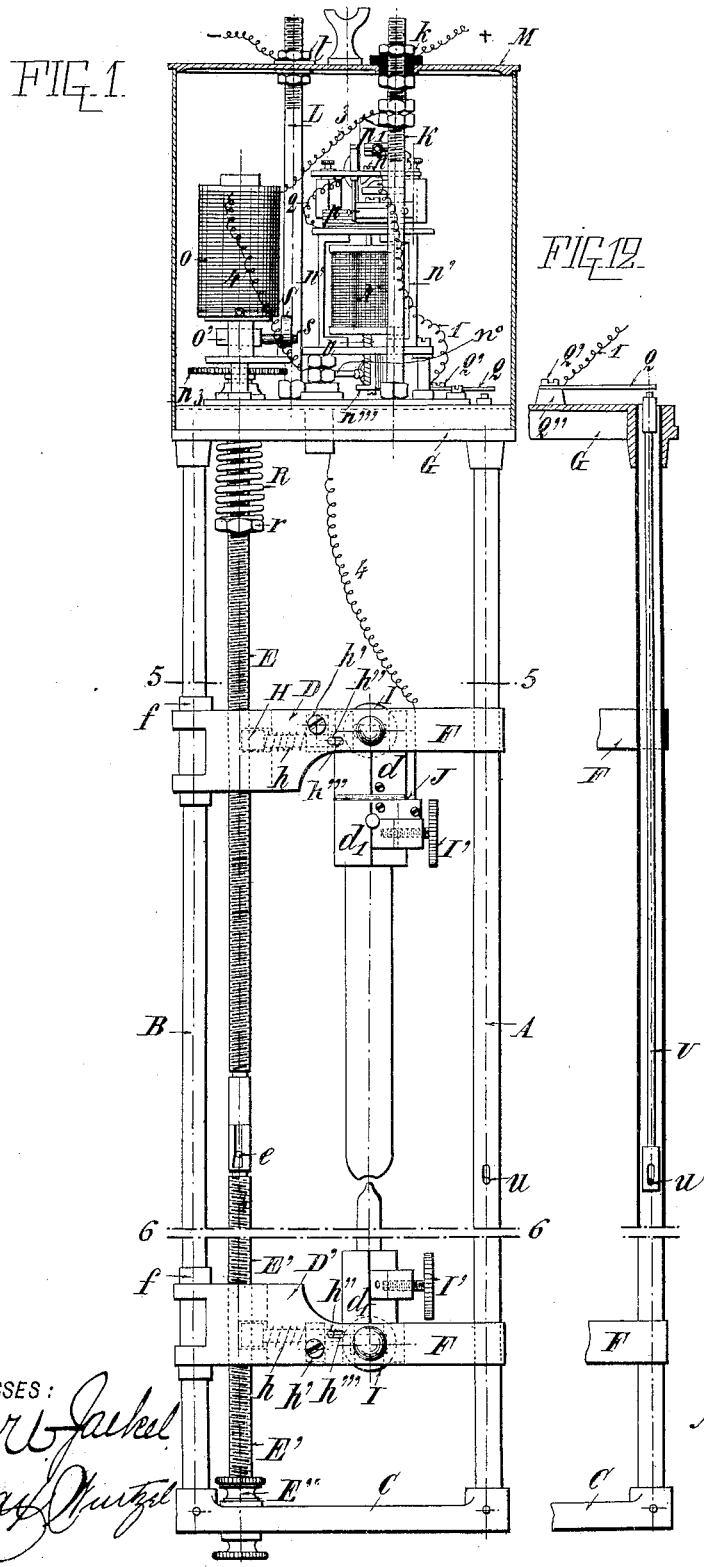
Figure 2:
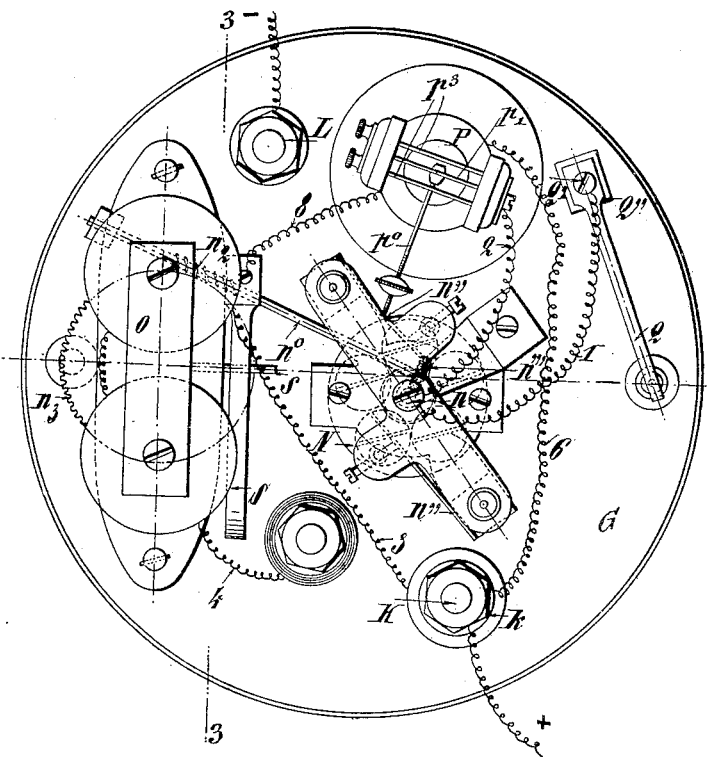
Figure 8:
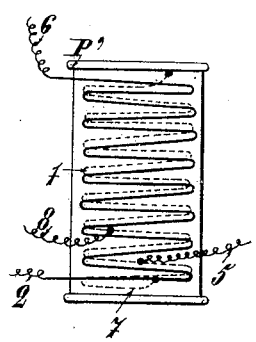
Figure 11:
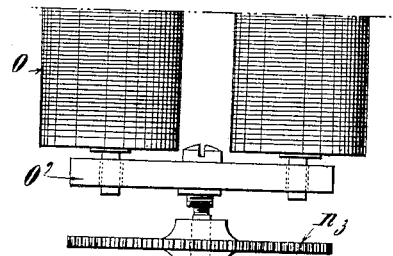

Figure 1 is an elevation of an electric-arc lamp embodying my improvements. Fig. 2 is a plan of same, drawn to a larger scale. Fig. 3 is a vertical section on line 3 3, Fig. 1, through the plate G, looking in the direction of the electromagnet, but drawn to a scale corresponding with Fig. 1. Fig. 4 shows in elevation and partial section the fine-wire regulator detached from the lamp. Fig. 5 is a plan, taken on the line 5 5 in Fig. 1, of the upper-carbon holder. Fig. 6 is a similar view, on the line 6 6 in Fig. 1, of the lower-carbon holder. Fig. 7 is a view of the carbon-holder proper detached. Fig. 8 is an enlarged view illustrating the method of coiling the fine wire pertaining to the regulator. Figs. 9 and 10 show alternative constructions of the regulating device. Fig. 11 is a view, detached and enlarged, showing the means for actuating the adjusting-screws pertaining to the carbon-holders. Fig. 12 illustrates the means for short-circuiting the lamp and effecting the stoppage of the motor, whereby on the carbons becoming exhausted an alarm is given and harm to the carbon-holder prevented. Fig. 13 is a perspective view of the parts of the mechanism which are mounted directly on the supporting-plate, and Fig. 14 is a diagram showing the circuit of the lamp and various instruments comprised in the circuit.

The regulating mechanism pertaining to the lamp rests on an upper supporting-plate G, to which are fixed two dependent rods or tubes A and B, connected together at their lower extremities by means of a cross-bar C. Upon these rods or tubes the carbon-holders D and D' are arranged to slide up or down.

The adjustment of the carbon-holders D D' nearer to or farther from each other is effected by means of vertically-arranged screw-threaded spindles E E', the spindle E, pertaining to the upper-carbon holder D, having a right-hand thread thereon, while the spindle E', pertaining to the lower-carbon holder D', is formed with a left-hand thread. The rotation of the screw-spindles causes the carbon-holders to approach toward or recede from each other, according to the direction of the rotation of the said spindles. The spindles E E' are in alinement, the lower end of the screw E entering the upper end of the screw E', the latter being provided with a hole for its reception. A slot or slots is or are formed in the side of the hole in the spindle E' for a pin $e$, carried by the screw E, to work in, whereby both screws are caused to rotate in unison and to regulate the positions of the carbon-holders, the rotary movement being imparted thereto by the motor of the lamp, as hereinafter explained.

The screws E E' are not formed upon a continuous rod, but they are capable of moving vertically, the one in relation to the other, by means of the pin $e$ on the one, E, working in a slot in the other, E', this being indispensable in order that the abrupt separation of the carbons at the desired moment in view of the formation of the arc may be effected.

Instead of using right and left hand screws and connecting them in the manner indicated I may employ a train of gearing, a bevel-wheel being placed on the lower end of the screw E and a second bevel-wheel on the upper end of the screw E', these two bevel-wheels gearing with a third bevel-wheel placed between them, so that on the screw E turning the screw E' will likewise turn, but in a reverse direction. In such an arrangement the threads of the screws E and E' are inclined in the same direction, or the screws E E', in lieu of being in alinement, may be placed alongside or parallel with each other.

The carbon-holders are divided into two parts, each part being distinct—namely, the "carbon-holder," properly so called, and the support therefor.

The support D for the upper-carbon holder $d$ is forked or bifurcated at F, Fig. 5, and at $f$ it is made in the form of a slide, which engages with the dependent rod or tube B, whereby the carbon-holder is guided in its vertical movements. The regulating-screw E passes through the support D, and against the screw a half-nut H is forced by the action of a spring $h$, this nut being fixed to the end of a rod $h'$, which terminates in a cross-pin $h''$, working in slots $h'''$. Thus it will be seen that by drawing back the cross-pin $h''$ the nut H will be released from engagement with the screw E, thereby permitting the movement of the carbon-holder to be accomplished by hand, if necessary, along the screw E. When the cross-pin $h''$, pertaining to the nut H, is allowed to return to its normal position, the nut H is again brought into contact with the screw E and maintained in that condition by means of the spring $h$. The "carbon-holder" $d$, Fig. 7, properly so called, and which comprises a socket of rectangular section, is provided with notches in the upper side, these notches receiving the forked or bifurcated portion F of the holder D.

I is a tightening-screw which enables the prongs pertaining to the forked piece F F to be brought toward each other, the screw I forcing the parts F F to compress between them the notched part of the carbon-holder $d$, whereby it is maintained in position. If the tightening-screw I be slightly loosened, the socket or carbon-holder $d$ can either assume a rotary movement about the screw I or it can be slightly moved from right to left or from left to right, whereby the rapid centering of the carbons may be accomplished. The carbon is inserted into the socket $d$ and is held therein by means of a fastening-screw I'.

The arrangement of the carbon-holder D' for the lower carbon is exactly the same as that just described for the upper-carbon holder D, with the exception that an insulating-plate J is interposed between the carbon-holder D and the socket $d$ for the upper carbon and which does not exist in connection with the lower-carbon holder, because, as will be seen later, the lower carbon must be in electrical connection with the mechanism of the lamp, while the upper carbon must not.

The supporting-plate G carries two upwardly-projecting rods K and L, one of which, K, is insulated from the said plate G, while the other, L, is in electrical contact therewith. These two rods serve, on the one hand, to conduct the current to and from the lamp, and, on the other hand, to hold the cap M of the lamp by means of nuts $k$ and $l$, the ring whereby the lamp is suspended being placed between the rods $k$ and $l$. The rod K, which is insulated from the plate G, is also insulated where it passes through the cap M of the lamp.

The organic parts which constitute the mechanism proper of the lamp, comprise, first, a motor N, Fig. 1, for operating the screws E E', whereby they are turned and consequently bring the carbons closer together in proportion as they wear out; second, an electromagnet O, Fig. 3, of coarse wire, the purpose of which is to effect the direct and instantaneous formation of the arc; third, a fine-wire regulator P, Figs. 4 and 8, whereby the action of the motor is governed.

I will now proceed to describe the several parts in detail and then the working of the lamp generally. The motor N, which I have adopted, is composed of five bobbins respectively placed on a plate which may be circular or in the form of a regular pentagon, in the centre of which plate the spindle $n$, upon which the motor rotates, is situated. The armatures $n'$ $n'$ are arranged diametrically opposite each other and at an equal distance from the axis. Over the motor the collector and two brushes $n''$ $n''$ are placed, the latter being diametrically opposite each other and electrically connected, so that there is no need to take into account the difference of voltage which may occur between the brushes. The wires coiled on the five bobbins are connected at their lower part with the lamp, and each of the upper ends of the wires of the bobbins abuts upon a segment of the collector. This collector is formed of five equal segments, to each of which one of the bobbins is attached. The brushes are connected, by means of a wire 1, with a spring Q and with the lower part of the fine-wire regulator P by means of another wire 2, Fig. 2.

The spindle $n$ of the motor carries at its lower end an endless screw which gears with a worm-wheel $n'''$, fast on a shaft $n^0$, furnished with an endless screw $n^2$, meshing with a horizontal worm-wheel $n^3$, Fig. 3, mounted on the upper prolongation of the screw E, whereby that screw is caused to revolve. At its upper extremity the screw E carries a plate $e'$, having two holes $e$ formed therein for the passage of two short rods $e^2$, which depend from the horizontal wheel $n^3$. Upon the rotation of the wheel $n^3$ the screw E is caused to turn through the medium of the two short rods $e^2$, which take into the holes $e$ in the plate carried by the screw E, Fig. 11.

A coarse-wire electromagnet O is traversed by the current upon its entering the lamp. It is connected by a wire 3 with the rod K, Fig. 2, the other end of the coarse wire coiled on the bobbins of the electromagnet being connected by another wire 4 with the upper carbon. The wire 4 ends, as shown in Fig. 1, at the lower part $d'$ of the upper-carbon holder, which, as previously stated, is insulated from the lamp. Underneath the electromagnet O is placed a metal plate O' or armature, which is attracted by the electromagnet when the latter is traversed by a current. The screw E is drawn upward by the wheel $n^3$; but its upper part passes with gentle friction through the wheel $n^3$ and screws itself into a nut beneath the armature or plate O', arranged in such a way that on the one hand the screw E can turn without involving in its rotation the plate O' and on the other hand the plate O', in rising, can likewise raise the screw E' to effect the abrupt separation of the carbons.

A spiral spring R is provided at the upper extremity of the screw E, one end of the spring abutting against the under side of the plate G, while the other end acts against a nut or washer $r$ on the screw E, the object being to prevent the screw E rising during the normal working of the lamp. This spring may, however, be placed over the plate O' between the two bobbins, or it may be arranged to rest on the plate O'.

The fine-wire regulator P comprises a solenoid-coil consisting of a bobbin on which twenty layers of fine wire are coiled. In the center of this bobbin is placed a metal core $p$, above which is a plate $p'$, pivoted at $p^2$. The plate $p'$ carries a counterweight $p^0$, the object whereof will be hereinafter explained. The plate $p'$, according to the position it occupies, can touch one of the rods $p^3$, Fig. 4, insulated from the lamp and connected by a wire 5 toward the bottom of the twentieth layer of fine wire pertaining to the bobbin P. The insulated rod K is connected by a wire 6 with one of the ends of the fine wire of the bobbin P. At the end of the nineteenth layer of fine wire, situated at the bottom of the bobbin, the fine wire divides into two, whereof one wire, 2, ends at the brushes of the motor, and the other, the twentieth layer, 7, Fig. 8, which is coiled upon the bobbin in an upward direction and the end of which is sunk in the upper plate P', is in connection with the lamp. In Fig. 8 I have supposed that the first nineteen layers of wire were blended into a single layer. The number of layers of fine wire has, however, nothing absolute about it, and it depends upon the degree of resistance the regulator is required to possess. From the twentieth layer and toward the bottom of the bobbin the wire 5 is taken to the short rods $p^3$, and also toward the bottom of the twentieth layer there is taken a wire 8, ending in a spring S, which is in connection with the lamp so long as the armature-plate O' is not attracted by the electromagnet O. This plate carries a pin $s$, which, when the plate is not attracted by the electromagnet, is in contact with the spring S, but which is out of contact therewith when the plate O' is attracted by the electromagnet O.

Besides the organic parts just described the regulating mechanism of the improved lamp also comprises a rod U, which is capable of vertical movement in the hollow guide A. This rod carries near its lower extremity a pin $u$, situated a little below the highest level attainable by the lower-carbon holder. The upper extremity of this rod U at normal times is maintained a short distance from a spring Q, secured to a post Q', but insulated from the lamp by a plate Q'' of insulating material. This post Q' is connected by a wire 1 with the brushes of the motor. The object thereof will be seen later in the description of the action of the motor.

Having specified the organic parts of the improved lamp, I will now proceed to describe the action thereof.

The carbons having been fixed in the carbon-holders D and D' are to be first regulated as regards position by means of the screws I and brought into contact with each other. This latter operation is effected by moving the carbon-holders by hand, as before explained. This being done, it is supposed that the lamp is placed in a circuit traversed by an electric current. The current enters the lamp by the insulated rod K and passes by way of the wire 3 into and through the electromagnet O, through the wire 4, to the insulated portion $d$ of the upper-carbon holder. The current passes into the lower carbon and from there it proceeds through the lamp to the rod L. Upon the electromagnet O being traversed by the current the plate O' or armature is attracted and the carbons which were originally in contact are abruptly separated, the electric arc is formed, and the lamp becomes operative.

I will now explain the operation of the motor N, which is situated in the circuit of derivation and which is governed by the regulator P, the object of which is to bring the carbons closer together in proportion as they are worn away by the electric arc. The current entering the coarse-wire electromagnet O by way of the insulated rod K passes through the wire 6 into the fine wire coiled on the regulator P, and after traversing the nineteen layers of wire the current on the one hand is conveyed to the brushes of the motor through the wire 2 and on the other hand to the lamp through the twentieth layer 7, Fig. 8, of the wire coiled on the regulator, provided that the pivoted plate $p'$ at the moment is not in contact with either of the short rods $p^3$. Now the pivoted plate $p'$ does not touch either of the rods $p^3$ when the current which passes through the regulator is sufficient to give the core $p$ such a magnetization that the plate $p'$ is kept vertical in spite of the action of the counterweight $p^0$, which tends to cause it to touch one of the rods $p^3$. Under these circumstances the current from the rod K, after traversing the nineteen layers of fine wire coiled on the regulator P, reaches the brushes of the motor and the latter turns, bringing the carbons toward each other, a very small part of the current passing through the resistance composed of the twentieth layer of wire of the regulator. Thus regularity in the working of the lamp is obtained.

If at a given moment the resistance of the lamp diminishes in consequence of the carbons being brought too close together, the quantity of current which traverses the regulator P (placed in the circuit of derivation) diminishes, and consequently the magnetization of the core $p$ becomes lower, so that the plate $p'$, being no longer maintained in a vertical position, touches one of the short rods $p^3$. The lamp is thus connected by the wire 5 with the last convolutions or coils of the twentieth layer of the regulator P. At that moment the current entering by the rod K traverses the first nineteen layers of wire of the regulator P, and then, as before, runs through two circuits, one of which is always formed by the brushes, the motor, and the lamp, the other, instead of being formed by the twentieth layer of wire of the regulator, being now only formed by a few coils of that twentieth layer and by the wire 5, which directly connects those coils with the lamp. The resistance of this second circuit is much weaker than that of the twentieth layer of wire, so that the quantity of current which traverses this circuit is much greater than that which originally traversed the twentieth layer of wire. Consequently the quantity of current which passes through the brushes and the motor diminishes. The motor, therefore, turns less rapidly, the carbons approach each other less rapidly, the resistance of the arc gradually increases, the magnetization of the core $p$ regains the necessary strength to return the pivoted plate $p'$ to its vertical position, and the lamp again acts as at first.

To explain the part played by the regulator P, it may be stated that the current of derivation, which comes from the insulated rod K and goes to the lamp, may before reaching the motor traverse two circuits, whereof one comprises the motor and the other contains a resistance which the regulator causes to vary in such a way as to diminish it when the quantity of current which is to pass through the motor is to be reduced and to increase it when, on the other hand, the quantity of current which is to pass through the motor is to be increased.

When the lower carbon is exhausted, it is desirable that the motor should stop automatically in order not to burn the carbon-holder. To effect this, the lower-carbon holder toward the end of its upward travel comes into contact with the pin $u$, carried by the rod U, and lifts it. The upper end of the rod U then makes contact with the spring Q. This rod U forms part of the lamp, the spring Q being connected by the wire 1 with the brushes in such a way that all the current which reaches the brushes, in order to go through the motor to the lamp, must pass through the wire 1, the resistance of which is nothing as compared with that of the motor. No current now flows through the motor, which will consequently stop, with the result that the formation of the arc ceases. Warning is thus given that it is necessary to put in new carbons.

It has hitherto been assumed that the bringing the carbons into contact with each other has taken place prior to the introduction of the current into the lamp. Were it otherwise the current at the outset would not pass through the electromagnet O, but would pass entirely through the circuit of derivation to the motor, which would revolve very rapidly and bring the carbons together. As soon as the latter comes into contact part of the current passes through the electromagnet O and the carbons and thence to the lamp, the arc is produced and the action brought about as above explained. If the carbons be out of contact, nearly all the current passes through the motor, only a very small portion thereof passing through the twentieth layer of the regulator. Under these circumstances large sparks would be produced in the brushes, and it is in order to avoid this inconvenience that I have arranged the circuit formed by the wire 8 and spring S, which is of less resistance than the twentieth layer. The effect of this is that so long as the carbons are not in contact, or, in other words, so long as the current does not pass through the electromagnet O a large part of the current will pass through the rod K, the regulator, the wire 8, the spring S, and the lamp. The motor in this case is not traversed by the whole of the current, and sparks would not result.

Referring to Figs. 9 and 10, the regulator P may take different forms without altering the principle upon which it is based. In Fig. 9 the core, whereby the pivoted plate $p'$ is attracted, is replaced by a bar connected with the plate itself. At normal times, when the lamp is acting regularly, the core $p$ preserves the plate $p'$ in a vertical position, but if the quantity of current passing through the regulator diminishes the core rises and causes the plate $p'$ to touch one of the rods $p^3$, as in the previously-described arrangement.

According to another modification (shown in Fig. 10) the regulator may be an electromagnet with two bobbins, the action being similar to the last-mentioned arrangement as regards the circuit formed by the fine wire on the regulator.

The lower end of the screw E' passes through the cross-bar C and is secured by rowel-nuts E'', whereby the vertical adjustment of the screws E E' may be accomplished. It will thus be seen that the distance between the two carbons at the moment of the production of the arc may be regulated, as desired, by hand. If by turning the nuts E'' the screws E E' are caused to rise, the upper end of the screw E—i. e., the plate O'—will approach the electromagnet O, and when this plate O' is attracted by the electromagnet O the screws E E' will separate very slightly. Similarly, by causing the said screws E E' to descend, the opposite effect will be produced. The nuts E″ also permit the operation of reducing or increasing the distance between the carbons to be effected while the lamp is working.

The employment of the fine-wire regulator herein described presents the advantage of being capable of regulation before delivery from the works and that it can be placed on the lamp without the lamp itself being subjected to any special regulating. Moreover, if desired, it may be placed at a distance from the lamp, as it will be readily understood that it would be as effective in regulating the lamp when removed therefrom as when placed in the lamp itself.

The several advantages of my invention are that there is a reduction in the weight of the lamp to a great extent; that there is absolute fixity of focus; that the carbons are brought together in a continuous manner; that the regulation of the carbons is effected at will and instantaneously; that the length of the arc may be regulated during the working of the lamp; that the lamp may be turned around for the reversed arc, this being made practicable by reason of the two rods $p^3$, for if one of these rods be used when the lamp is upright the other one serves when the lamp is reversed; that the lamp works on a minimum tension; that the facility of construction for several foci is enabled without appreciable increase in cost; that there is absence of insulation in the mounting and perfect rigidity; that there is absence of springs as a regulating medium; that the intensity is variable; that the regulator, regulated beforehand, may be transferred from one lamp to another without necessitating any other regulating operation of the lamp itself.

As previously explained, the improved lamp is herein described as working on a continuous current; but it will be apparent that with the necessary modifications in the electromagnet O and in the regulator P the lamp may be worked with alternating currents.

Having now particularly described and ascertained the nature of this invention and in what manner the same is to be performed, I claim—

1. In an electric-arc lamp, a motor interposed in the circuit of derivation, and comprising an uneven number of bobbins, each having the wire coiled thereon connected, at one end, with the lamp, and at the other end with a segment of the collector, said collector comprising a number of insulated segments against which the brushes rub, and which are equal in number to the bobbins; the current of derivation entering the motor through the brushes and going out through the lamp.

2. In an electric-arc lamp, the combination, with the motor, of a fine-wire regulator, placed in the circuit of derivation, and comprising a bobbin whereon are coiled $n$ layers of fine wire, the $n$th of which is connected with the lamp, while the $n$-first is connected with the motor, the bobbin having in its center a metal core, the end of which is in juxtaposition to a plate provided with a counterweight, said plate maintaining a vertical position so long as the current passing through the regulator is sufficient to cause the metal core to attract the plate; the said plate coming into contact with a rod when the current passing through the regulator diminishes, the object of the contact of the plate with the rod being to place the last coils of the $n$th layer of wire in direct connection with the lamp, in order to produce a circuit of less resistance than the $n$th layer of wire itself, with the result that the quantity of current which reaches the motor through the end of the $n$-first layer of fine wire is diminished.

3. In an electric-arc lamp, the combination with the motor and the fine-wire regulator, of a spring, and additional wire to prevent sparking at the brushes; the whole of the current passing through the brushes in the event of the lamp being set to work without the carbons being in contact; said additional wire connecting the last coils of a layer of fine wire of the regulator with said spring, which is in contact with the lamp so long as the arc is not formed; so that, while the arc is not produced, part of the current passes through the wire which connects the last coils of the said layer of wire of the regulator directly with the lamp.

4. In an electric-arc lamp, means for obtaining the automatic formation of a short-circuit, whereby the motor for feeding the carbons, and which is situated in the circuit of derivation is instantly stopped when the carbons are used up, the same comprising a rod U and spring Q insulated from the lamp and connected with the brushes of the motor, said rod upon being raised by the lower-carbon holder as soon as the latter reaches the limit of its upward movement, coming in contact with said spring and causing the current, instead of passing through the motor to reach the lamp, to pass through the circuit of smaller resistance closed by the contact of the rod with the spring.

5. In an electric-arc lamp, such as herein described, the combination with the screws E, E′, which produce the movement of the carbon-holders, of rowel-nuts E″ for enabling the screws E E′ to be operated by hand, substantially as specified.

In testimony whereof I have signed this specification in the presence of two subscribing witnesses.

ADOLPHE MOUGIN.

Witnesses:
J. ALLISON BOWEN,
JULES TOUSSET.